(12) United States Patent
Dressel et al.

(10) Patent No.: US 12,009,125 B2
(45) Date of Patent: Jun. 11, 2024

(54) FLAT ELECTRICAL CABLE WITH AT LEAST ONE COOLING CHANNEL, ASSEMBLY WITH SUCH A FLAT CABLE AND USE OF SUCH A FLAT CABLE

(71) Applicant: TE Connectivity Germany GmbH, Bensheim (DE)

(72) Inventors: Andre Martin Dressel, Bensheim (DE); Florian Brabetz, Bensheim (DE); Rudi Blumenschein, Woert (DE); Gerzson Toth, Bensheim (DE); Uwe Hauck, Berlin (DE)

(73) Assignee: TE Connectivity Germany GmbH, Bensheim (DE)

( * ) Notice: Subject to any disclaimer, the term of this patent is extended or adjusted under 35 U.S.C. 154(b) by 65 days.

(21) Appl. No.: 17/325,677

(22) Filed: May 20, 2021

(65) Prior Publication Data
US 2021/0366630 A1 Nov. 25, 2021

(30) Foreign Application Priority Data
May 20, 2020 (DE) .................... 10 2020 206 386.9

(51) Int. Cl.
| H01B 7/42 | (2006.01) |
| H01B 7/08 | (2006.01) |
| H01M 10/613 | (2014.01) |
| H01M 10/6554 | (2014.01) |
| H01M 10/6556 | (2014.01) |
| H01M 10/6568 | (2014.01) |
| H01M 50/502 | (2021.01) |

(52) U.S. Cl.
CPC ........... *H01B 7/425* (2013.01); *H01B 7/0823* (2013.01); *H01M 10/613* (2015.04); *H01M 10/6554* (2015.04); *H01M 10/6556* (2015.04); *H01M 10/6568* (2015.04); *H01M 50/502* (2021.01)

(58) Field of Classification Search
CPC ............ H01M 50/502; H01M 10/613; H01M 10/6554; H01M 10/6556; H01M 10/6568; H01B 7/425; H01B 7/0823
See application file for complete search history.

(56) References Cited

U.S. PATENT DOCUMENTS 10,439,258 B2   10/2019   Kaiser et al.
10,811,170 B2*  10/2020   Gontarz ................. B60L 53/16
(Continued)

FOREIGN PATENT DOCUMENTS

CA      3025028 A1      11/2017
CN      203406068 U  *   1/2014   ............. H01B 11/22
(Continued)

OTHER PUBLICATIONS

Extended European Search Report, App. No. 21174926.2-1201, dated Oct. 11, 2021, 8 pages.
(Continued)

*Primary Examiner* — Karie O'neill Apicella
(74) *Attorney, Agent, or Firm* — Barley Snyder

(57) ABSTRACT

A flat electrical cable comprises a conductive core having a core sheath and a cooling channel having a cooling channel sheath. The cooling channel and the core extend mutually parallel to one another along a length of the cable and are integrally joined to one another by a web extending along the core and the cooling channel.

20 Claims, 1 Drawing Sheet

(56) References Cited

U.S. PATENT DOCUMENTS

| | | | |
|---|---|---|---|
| 2012/0270094 A1 | 10/2012 | Hohenthanner et al. | |
| 2014/0079965 A1* | 3/2014 | Schaefer | H01M 50/202 |
| | | | 429/149 |
| 2014/0124232 A1* | 5/2014 | Sarchi | F16L 11/22 |
| | | | 174/27 |
| 2018/0190410 A1 | 7/2018 | Cao et al. | |

FOREIGN PATENT DOCUMENTS

| | | | | |
|---|---|---|---|---|
| CN | 203406068 U | | 1/2014 | |
| EP | 2546906 A1 | | 1/2013 | |
| JP | 2012199206 A | * | 10/2012 | H01B 7/08 |
| JP | 2012199206 A | | 10/2012 | |
| KR | 20140014227 A | | 2/2014 | |

OTHER PUBLICATIONS

Examination Report from the European Patent Office dated Feb. 1, 2023, corresponding to Application No. 21 174 926.2-1201, 8 pages.

* cited by examiner

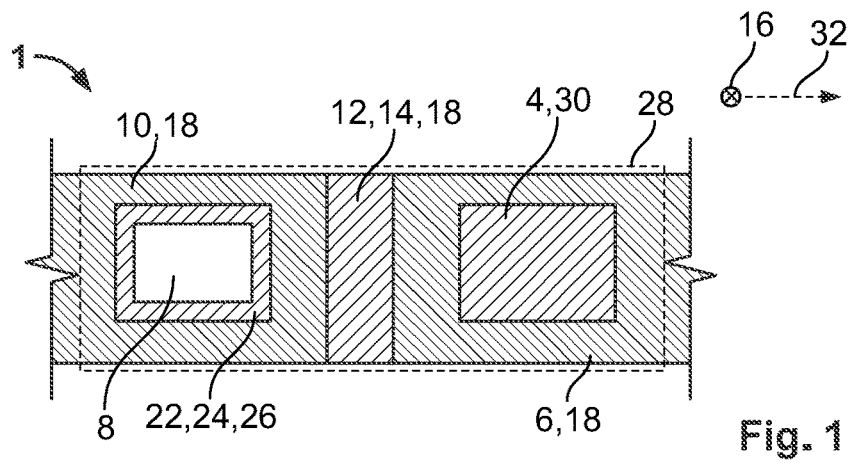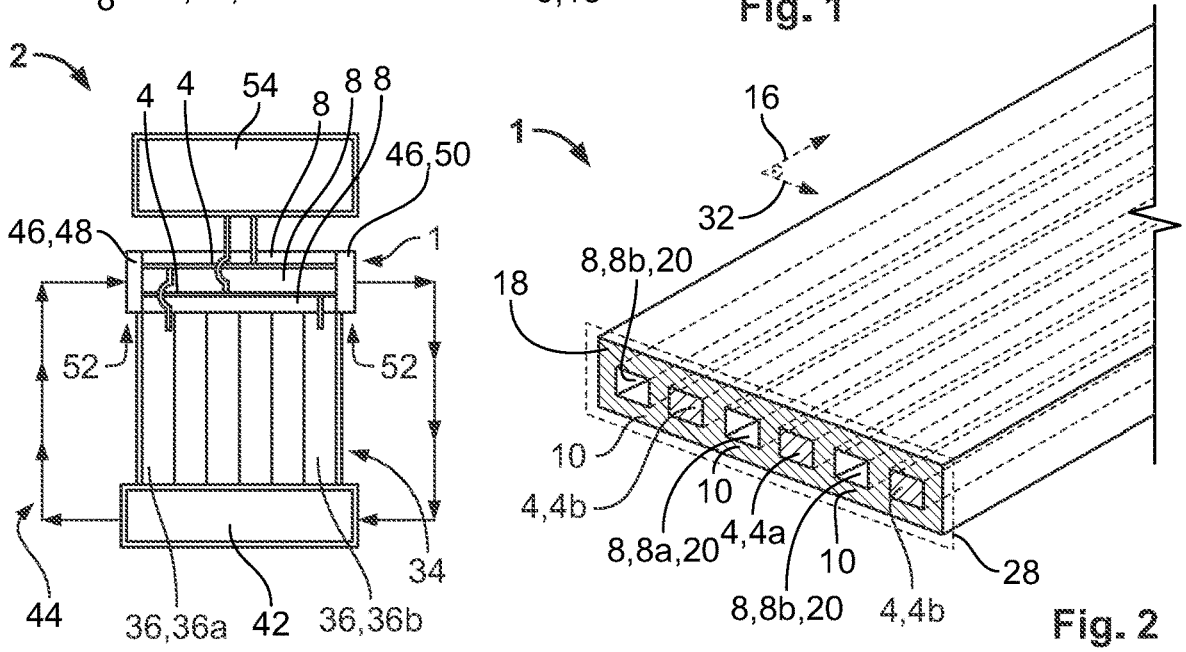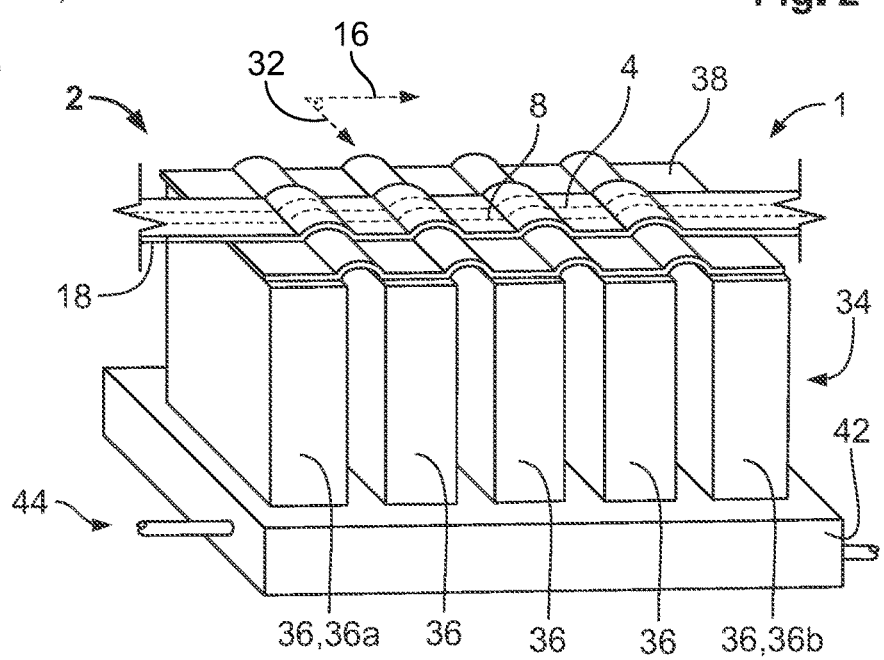

FLAT ELECTRICAL CABLE WITH AT LEAST ONE COOLING CHANNEL, ASSEMBLY WITH SUCH A FLAT CABLE AND USE OF SUCH A FLAT CABLE

CROSS-REFERENCE TO RELATED APPLICATIONS

This application claims priority under 35 U.S.C. § 119 to German Patent Application No. DE 10 2020 206386.9, filed May 20, 2020, the entire disclosure of which is incorporated herein by reference.

FIELD OF THE INVENTION

The present disclosure relates to an electrical cable, and more specifically, to a flat electrical cable with at least one integrated cooling channel.

BACKGROUND

Batteries comprising at least one cell, and typically several cells, are used in the field of electromobility. These cells are often connected by flat electrical cables which mostly run along the upper side of the cells. However, the cells are generally only cooled on an underside of the cells facing away from the flat cable. As a result, the dissipation heat from electrochemical charging and discharging processes in the cells can create a considerable thermal gradient over the height of the cells.

Accordingly, there is a need for improved electrical cables and cable assemblies which prevent or reduce the development of high thermal gradients in battery cells and in other electrotechnical devices without increasing the required installation space which is subject to strict specifications, in particular in the field of electromobility.

SUMMARY

According to an embodiment of the present disclosure, a flat electrical cable comprises a conductive core having a core sheath and a cooling channel having a cooling channel sheath. The cooling channel and the core extend mutually parallel to one another along a length of the cable and are integrally joined to one another by a web extending along the core and the cooling channel.

BRIEF DESCRIPTION OF THE DRAWINGS

The invention will now be described by way of example with reference to the accompanying Figures, of which:

FIG. 1 shows a front view of a schematic sectional illustration of a flat electrical cable of the invention according to a possible embodiment;

FIG. 2 shows a schematic perspective sectional illustration of a flat electrical cable of the invention according to a further embodiment;

FIG. 3 shows a schematic perspective illustration of an assembly of the invention according to an exemplary embodiment; and FIG. 4 shows a schematic illustration of a circuit diagram of an assembly of the invention according to a further exemplary embodiment.

DETAILED DESCRIPTION OF THE EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Embodiments of the present invention shall be described hereafter in detail with reference to FIGS. 2A to 13D. The schematic structure of a flat electrical cable 1 according to the invention is explained with reference to FIGS. 1 and 2. The schematic structure of an assembly 2 according to the invention is described with reference to FIGS. 3 and 4. Finally, a use of the assembly according to the invention is explained with reference to FIG. 4.

As shown in FIG. 1, the flat electrical cable 1 according to the invention can comprise at least one core 4 with at least one core sheath 6, at least one cooling channel 8 with at least one cooling channel sheath 10, and at least one web 12. The at least one web 12 integrally connects the at least one core sheath 6 and the at least one cooling channel sheath 10 to one another. Furthermore, the at least one core 4 and the at least one cooling channel 8 are spaced from one another by the at least one core sheath 6 and/or the at least one cooling channel sheath 10 and/or the at least one web 12.

The at least one web 12 can extend along the at least one core 4 and the at least one cooling channel 8. For example, the at least one web 12 can be a material bridge 14 which continuously or discontinuously connects the at least one core sheath 6 and the at least one cooling channel sheath 10 to one another along a direction of extension 16 of the flat electrical cable 1. In the case of the discontinuous connection, the material bridge 14 can comprise discontinuations (not shown). Alternatively, the at least one web 12 can be formed by spacers (not shown) running transverse to direction of extension 16 of the flat electrical cable 1. The spacers can be arranged along direction of extension 16 of the flat electrical cable 1 at regular or irregular intervals.

As can also be seen in FIG. 1, the at least one core sheath 6 and/or the at least one cooling channel sheath 10 and/or the at least one web 12 can each be produced from different materials, i.e., they can differ in the chemical and/or physical and/or mechanical properties. Alternatively, the at least one core sheath 6, the at least one cooling channel sheath 10, and the at least one web 12 can be produced from the same material, as illustrated in FIG. 2. As shown, the at least one core sheath 6, the at least one cooling channel sheath 10, and the at least one web 12 together form a cable jacket 18 of the flat electrical cable 1. The cable jacket 18 can preferably be produced from electrically insulating material, such as polyvinyl chloride (PVC).

The flat electrical cable 1 can include at least two cores 4 and/or at least two cooling channels 8 which each extend through the flat electrical cable 1 and are spaced from one another. In the embodiment shown in FIG. 2, the flat electrical cable 1 is shown by way of example with three cores 4 and three cooling channels 8. As can also be seen in FIG. 2, the cores 4 and the cooling channels 8 extend mutually parallel.

A respective cooling channel 8 can be disposed between two adjacent cores 4a, 4b and/or a respective core 4 can be disposed between two adjacent cooling channels 8a, 8b. In other words, the cores 4 and the cooling channels 8 in the flat electrical cable 1 are arranged next to one another along a direction of the arrangement 32. The cores 4 and the cooling channels 8 can be arranged alternately in the flat electrical cable 1. Specifically, the cores 4 and cooling the channels 8 are arranged alternately transverse to the direction of extension 16 of the flat electrical cable 1.

The at least one cooling channel 8 is integrated into the flat electrical cable 1. For example, the at least one cooling channel 8 can be formed by a cavity 20 created in the at least one cooling channel sheath 10. All of the cooling channels 8 in FIG. 2 are formed by the cavities 20, wherein the cavities 20 are each created in a cooling channel sheath 10 which forms part of the cable jacket 18.

Alternatively, a wall 22, in particular an inner wall 24 of the at least one cooling channel 8, can be made from a different material than the at least one cooling channel sheath 10. The inner wall 24 can be formed in particular by a tube 26 embedded in the at least one cooling channel sheath 10. In other words, the tube 26 is surrounded on all sides by the at least one cooling channel sheath 10 or by the cable jacket 18, respectively, in at least one cross section 28 of the flat electrical cable perpendicular to the direction of extension 16. The at least one core 4 can accordingly be a copper conductor 30 embedded in the at least one core sheath 6 or in the cable jacket 18, as is illustrated in FIG. 1.

The at least one core 4 and/or the at least one cooling channel 8, respectively, in a cross section of the flat electrical cable 1 can have a rectangular profile, in particular in a cross section 28 perpendicular to the direction of extension 16 of the flat electrical cable 1. The respective rectangular profiles are preferably oriented to be flat. Specifically, the long edges of the respective rectangular profiles are parallel to direction of the arrangement 32 of the at least one core 4 and the at least one cooling channel 8. Alternatively, the at least one core 4 and/or the at least one cooling channel 8 can have a square, round or oval profile.

FIGS. 3 and 4 show possible embodiments of an assembly 2 according to the invention. The assembly 2 can comprise a flat electrical cable 1 according to the embodiments described above and a battery 34 with at least one cell 36. The at least one core 4 of the flat electrical cable 1 is in electrical contact with the at least one cell 36 of the battery 34. For example, the at least one core 4 is in contact with a high-voltage connection (not shown) or a sensor (not shown) of the at least one cell 36. In the case of a sensor contact, the sensor measurement data that has been read out can be passed via the at least one core 4, for example, to an active cell management system 54 (see FIG. 4).

The at least one cell 36 can be, for example, a pouch cell, a cylindrical cell, a prismatic cell, or any other type of galvanic cell.

The battery 34 can comprise at least two cells 36 which are connected to one another by way of a cell connector 38. FIG. 3 shows the battery 34 with five cells 36 by way of example. The flat electrical cable 1 touches the cell connector 38 at least in sections. The flat electrical cable 1 may run along the entire cell connector 38, such that the flat electrical cable 1 reaches a respective first cell 36a of the battery 34 and a last cell 36b of the battery 34.

It can also be seen in FIG. 3 that the flat cable 1 according to the invention can be configured to be flexible. The flexible flat electrical cable 1 can adapt in particular to an uneven surface structure of the cell connector 38 and nestle against or abut the cell connector 38. The flat electrical cable 1 can be adhesively bonded to the cell connector 38 over the entire contact length between the flat electrical cable 1 and the cell connector 38. Alternatively, the flat electrical cable 1 and the cell connector 8 can be adhesively bonded only in individual sections. Instead of adhesive bonding, the flat electrical cable 1 can also be attached to the cell connector 38 by screwing, welding, soldering, or riveting, by way of example only.

The assembly 2 according to the invention in FIGS. 3 and 4 is also shown with a battery cooling plate 42. The battery cooling plate 42 can be arranged as part of a coolant circuit 44 for cooling the battery 34 below the cells 36. The flat electrical cable 1 according to the invention can also be used to the cool battery 34. According to this use of the invention shown in FIG. 4, liquid coolant can be tapped from the coolant circuit 44 and flow through the at least one cooling channel 8 of the flat electrical cable 1.

For this purpose, the flat electrical cable 1 can comprise at least one connection member 46 for an inlet 48 and/or outlet 50 for the coolant. FIG. 4 shows the flat electrical cable 1 with a connection member 46 each for the inlet 48 and the outlet 50 with which the coolant can be delivered into or out of three of the cooling channels 8 shown. The connection members 46 are each disposed at one end 52 of the flat electrical cable 1. Alternatively, the at least one connection member 46 can also be arranged as a T-member between the two ends 52 of the flat electrical cable 1.

All of the cooling channels 8 in the connection members 46 can each be connected to one another at a connection point. Specifically, the coolant at the connection member 46 for the inlet 48 is evenly distributed to respective cooling channels 8 at the respective connection point. Analogously, the coolant is merged at the connection member 46 for outlet 50.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A flat electrical cable, comprising:
a conductive core with an electrically insulating monolithic core sheath directly adjacent to and surrounding the core;
a cooling channel with a monolithic cooling channel sheath, the cooling channel and the core extending mutually parallel to one another; and
a web extending along the core and the cooling channel and integrally and directly joining the core sheath and the cooling channel sheath with one another.

2. The flat electrical cable according to claim 1, wherein the cooling channel is formed by a cavity produced in the cooling channel sheath.

3. The flat electrical cable according to claim 2, wherein a wall of the cooling channel is produced from a different material than the cooling channel sheath.

4. The flat electrical cable according to claim 3, wherein at least one of the core or the cooling channel have a rectangular cross section.

5. The flat electrical cable according to claim 4, wherein the web is part of a monolithic cable jacket of the flat electrical cable, and the cooling channel is embedded in the cable jacket.

6. The flat electrical cable according to claim 5, wherein the core is embedded in the cable jacket.

7. The flat electrical cable according to claim 6, wherein the cable comprises at least one of at least two cores or at least two cooling channels which extend through the flat electrical cable spaced from one another.

8. The flat electrical cable according to claim 7, wherein at least one of a cooling channel is disposed between two adjacent cores or a core is disposed between two adjacent cooling channels.

9. An electrical assembly, comprising:
a flat electrical cable including:
a conductive core having an electrically insulating monolithic core sheath;
a cooling channel having a monolithic cooling channel sheath, the cooling channel and the core extending mutually parallel to one another;
an inlet connection member and an outlet connector member in communication with respective ends of the cooling channel; and
a web extending along the core and the cooling channel and integrally and directly joining the core sheath and the cooling channel sheath with one another;
a cooling circuit, the inlet connection member, and the outlet connection member of the cable in fluid communication with the cooling circuit for providing liquid coolant through the cooling channel;
a battery comprising at least one cell, wherein the core of the cable is in electrical contact with the at least one cell; and
a battery cooling plate for cooling the battery, the battery cooling plate in communication with or forming part of the cooling circuit providing the liquid coolant to the cooling channel of the cable.

10. The electrical assembly according to claim 9, further comprising a plurality of cooling channels formed through the cable and in fluid communication with the inlet connection member and the outlet connector member.

11. The electrical assembly according to claim 9, wherein the at least one cell is a pouch cell.

12. The electrical assembly according to claim 9, wherein the battery comprises at least two cells which are connected to one another via a cell connector, the cable contacting the cell connector over its length.

13. The electrical assembly according to claim 12, wherein the cable is adhesively bonded to the cell connector.

14. The electrical assembly according to claim 9, wherein the cable comprises a plurality of alternatingly arranged cores and cooling channels.

15. The electrical assembly according to claim 9, wherein a wall of the cooling channel is produced from a different material than the cooling channel sheath.

16. The flat electrical cable according to claim 1, wherein the web completely isolates the core sheath from the cooling channel sheath, and the core and the cooling channel arranged outside of the web.

17. A flat electrical cable, comprising:
a conductive core with an electrically insulating monolithic core sheath directly surrounding the core;
a cooling channel with a monolithic cooling channel sheath, the cooling channel and the core extending mutually parallel to one another; and
a web extending along the core and the cooling channel and integrally and directly joining the core sheath and the cooling channel sheath with one another, wherein the web is distinct from and formed from a different material than the cooling channel sheath and does not surround either the cooling channel or the core.

18. The flat electrical cable according to claim 17, wherein the web completely isolates the core sheath from the cooling channel sheath, and the core and the cooling channel are arranged outside of the web.

19. The flat electrical cable according to claim 18, wherein the electrically insulating monolithic core sheath directly contacts the core about its perimeter.

20. The flat electrical cable according to claim 1, wherein the electrically insulating monolithic core sheath directly contacts the core about its perimeter.

* * * * *